(12) United States Patent
Rohling et al.

(10) Patent No.: US 8,170,143 B2
(45) Date of Patent: May 1, 2012

(54) METHOD AND TRANSMITTING DEVICE FOR ENCODING DATA IN A DIFFERENTIAL SPACE-TIME BLOCK CODE

(75) Inventors: Hermann Rohling, Wolfenbüttel (DE); Alexander Vanaev, Hamburg (DE)

(73) Assignee: Siemens Aktiengesellschsft, Munich (DE)

( * ) Notice: Subject to any disclaimer, the term of this patent is extended or adjusted under 35 U.S.C. 154(b) by 345 days.

(21) Appl. No.: 11/990,945

(22) PCT Filed: Aug. 21, 2006

(86) PCT No.: PCT/EP2006/065519
§ 371 (c)(1),
(2), (4) Date: Aug. 20, 2009

(87) PCT Pub. No.: WO2007/023152
PCT Pub. Date: Mar. 1, 2007

(65) Prior Publication Data
US 2009/0316830 A1    Dec. 24, 2009

(30) Foreign Application Priority Data

Aug. 24, 2005 (DE) .......................... 10 2005 040 067

(51) Int. Cl.
*H04L 27/20* (2006.01)

(52) U.S. Cl. ........ 375/308; 375/141; 375/260; 375/265; 375/267; 375/296; 375/299; 375/341

(58) Field of Classification Search .................. 375/300, 375/308, 320, 141, 260, 262, 265, 267, 296, 375/299, 329, 341; 370/204, 208, 209, 210, 370/465, 479; 704/200, 503; 714/786
See application file for complete search history.

(56) References Cited

U.S. PATENT DOCUMENTS
7,773,699 B2 *   8/2010   Jia et al. ..................... 375/341

OTHER PUBLICATIONS

Siavash M. Alamouti; A Simple Transmit Diversity Technique for Wireless Communications; IEEE Journal on Select Areas in Communications; IEEE; Magazine; 1998.
Zheng Du et al: "A new two level differential unitary space-time modulation" Wireless Communications and Networking Conference, 2005 IEEE, New Orleans, LA, USA Mar. 13-17, 2005, Piscataway, NJ. USA, IEEE Mar. 13, 2005, pp. 479-482, XP010791210 ISBN: 0-7803-8966-2; Others; 2005.
Xiang-Gen Xia: "Differentially En/Decoded Orthogonal Space-Time Block Codes With APSK Signals" IEEE Communications Letters, IEEE Service Center , Piscataway, NJ, US, vol. 6, nr.4, Apr. 2002,XP011066340, ISSN: 1089-7798; Others; 2002.
IEEE Transactions on signal processing, vol. 51, No. 11, Nov. 2003 "Differential Space Time Block Codes Using Nonconstant Modulus Constellations" Chan-Soo Hwang et al.; Others; 2003.

(Continued)

*Primary Examiner* — Dhaval Patel
(74) *Attorney, Agent, or Firm* — Staas & Halsey LLP

(57) ABSTRACT

A method and a corresponding transmitting device to encode data with a differential space-time block code. A code matrix is calculated recursively from a momentary data matrix with a previous code matrix as a DSTBC block with symbols that are to be transmitted, the data matrix is formed from at least two data symbols that are to be transmitted, and the amplitude is modulated. Amplitude modulation data is encoded into an amplitude difference of at least two data symbols within each individual DSTBC block.

15 Claims, 3 Drawing Sheets

OTHER PUBLICATIONS

Vahid Tarokh et al. "A Differential Detection Scheme for Transmit Diversity" IEEE Journal on selected Areas in Communications, vol. 18, No. 7, Jul. 2000; Others; 2000.

C. Gao, A. Haimovich, D. Lao "Bit Error Probability for Space-Time Block Code with Coherent and Differential Detection" New Jersey, USA; Others.

H. Jafarkhani, Vahid Tarokh, "Multiple transmit antenna differential detection from generalized orthogonal designs" IEEE Transactions on Information Theory, vol. 47, pp. 2626-2631, Sep. 2001; Others; 2001.

H. Rohling, V. Engels, "Differential amplitude phase shift keying. (DAPSK)—a new modulation method for DVBT" pp. 102-18,; Others; 1995.

G. Bauch "A Bandwidth-Efficient Scheme for Non-Coherent Transmit Diversity" in Proc. of IEEE Globecom Conference, San Francisco, CA, USA, Dec. 1-5, 2003; Others; 2003.

G.Bauch "Differential Amplitude and Unitary Space-Time Modulation", in Proc. of $5^{th}$ International ITG Conference on Source and Channel Coding, Erlangen (Germany) Jan. 14-16, 2004.

International Search Report (PCT/ISA/210) mailed on Dec. 4, 2006 in connection with the International Application No. PCT/EP2006/065519.

* cited by examiner

FIG 2
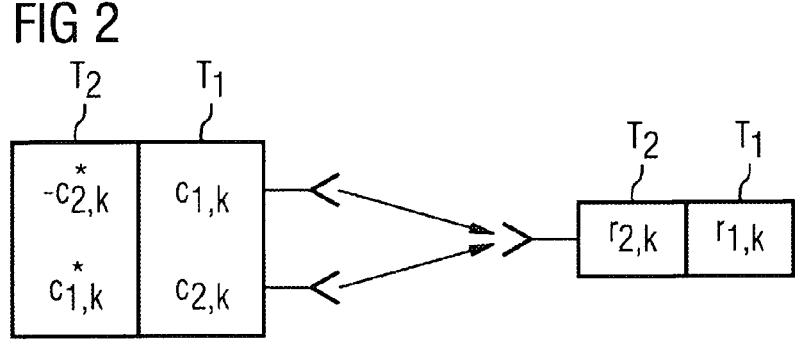
FIG 3
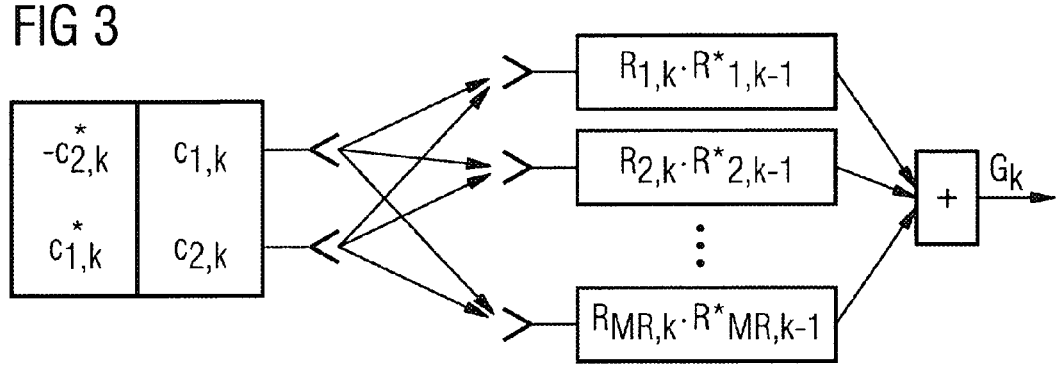
FIG 4
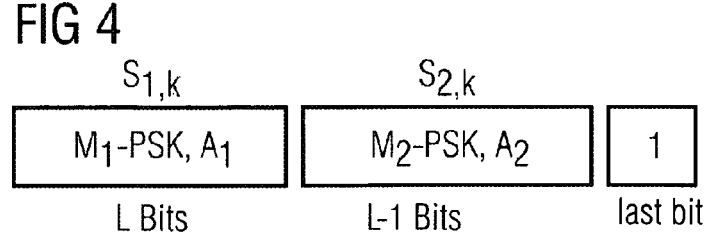
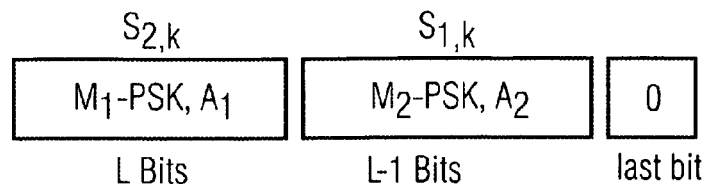

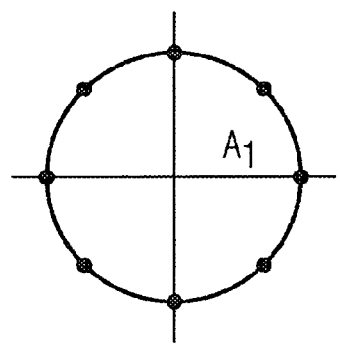
FIG 5A
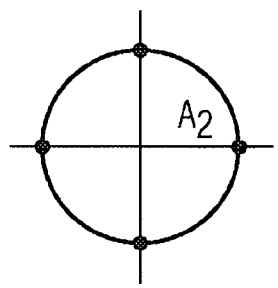
FIG 5B
FIG 6
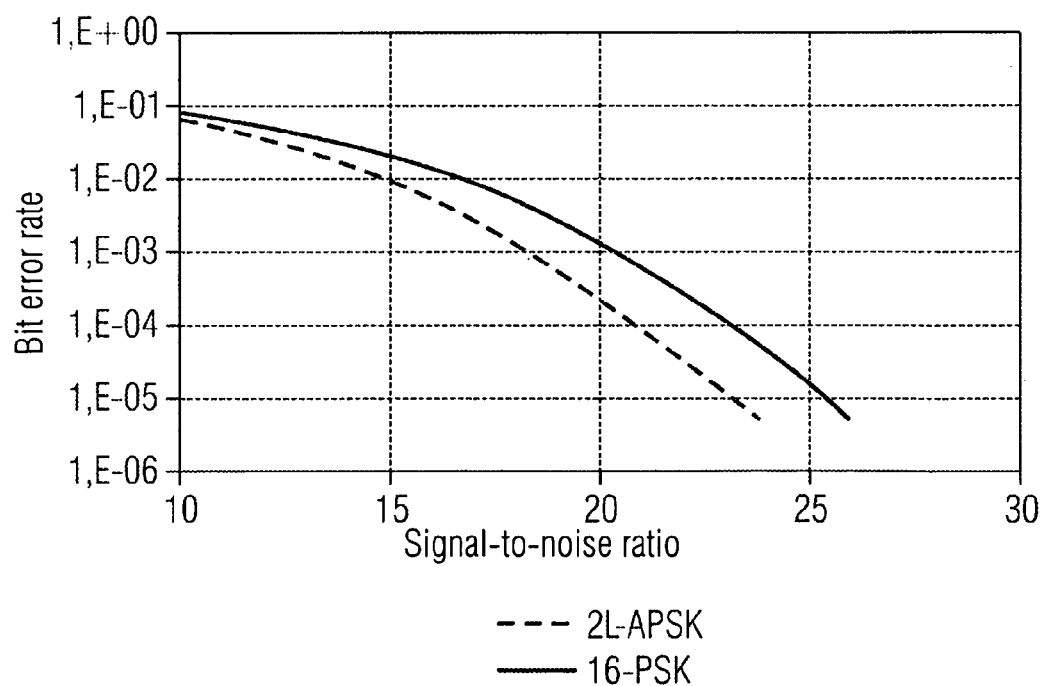

METHOD AND TRANSMITTING DEVICE FOR ENCODING DATA IN A DIFFERENTIAL SPACE-TIME BLOCK CODE

CROSS REFERENCE TO RELATED APPLICATIONS

This application is based on and hereby claims priority to German Application No. 10 2005 040 067.1 filed on Aug. 24, 2005 and PCT Application No. PCT/EP2006/065519 filed on Aug. 21, 2006, the contents of which are hereby incorporated by reference.

BACKGROUND OF THE INVENTION

The invention relates to a method for encoding data using a differential space-time block code (DSTBC), to a method for decoding data encoded and transmitted in this way, and to a transmitting device and receiving device respectively for carrying out such methods.

A DSTBC scheme for two transmit antennas was described in V. Tarokh and H. Jafarkhani, "A differential detection scheme for transmit diversity," IEEE Journal on Selected Areas in Communications, vol. 18, pp. 1169-1174, July 2000. DSTBC is based on STBC (space-time block code), described in S. Alamouti, "A simple transmit diversity technique for wireless communications," IEEE Journal on Selected Areas of Communications, Special Issue on Signal Processing for Wireless Communications, vol. 16, no. 8, pp. 1451-1458, 1998. Another description of DSTBC may be found in C. Gao, A. Haimovich, D. Lao "Bit Error Probability for Space-Time Block Code with Coherent and Differential Detection", IEEE Vehicle Technology Conference (VTC '02 Fall), September 2002, Vancouver, Canada. A generalization of DSTBC is given in H. Jafarkhani and V. Tarokh, "Multiple transmit antenna differential detection from generalized orthogonal designs," IEEE Transactions on Information Theory, vol. 47, pp. 2626-2631, September 2001.

Similarly to STBC, an individual DSTBC codeword or an individual DSTBC code occupies two time slots of the transmission carrier, each individual code carrying two information symbols. For DSTBC technology, no channel information is required, either at the receiver end or at the transmitter end, which makes this technology very attractive, especially in cases where reliable channel information is difficult to obtain. With DSTBC technology, a differentially encoded code sequence $C_k$ is recursively calculated according to $$C_k = S_k \cdot C_{k-1}. \tag{1}$$

The next code matrix $C_k$ in each case is calculated by multiplying a current information matrix $S_k$ by the previous code matrix $C_{k-1}$. This means that the information matrix $S_k$ is differentially encoded similarly to differential phase modulation schemes. The information matrix $S_k$ is generated on the basis of two information symbols $s_{1,k}$ and $s_{2,k}$ which must be transmitted according to an information matrix structure with $$S_k \begin{pmatrix} s_{1,k} & s_{2,k} \\ -s_{2,k}^* & s_{1,k}^* \end{pmatrix} \tag{2}$$

If the information symbols $s_{1,k}$ and $s_{2,k}$ are taken from a pure PSK (phase shift keying) constellation diagram, the absolute values are normalized according to $$|s_{1,k}| = |s_{2,k}| = \frac{1}{\sqrt{2}}. \tag{3}$$

In this case it follows from (2) that $$S_k \cdot S_k^* = = I_2. \tag{4}$$

This means that for modulation schemes of increasingly higher order compared to QAM (quadrature amplitude modulation), PSK degradation becomes increasingly greater, virtually reaching 10 dB for modulation schemes with 6 bit/s/Hz bandwidth efficiency.

The performance of differential single-antenna transmission techniques and higher-level DPSK (differential PSK) modulation is described in H. Rohling and V. Engels, "Differential amplitude phase shift keying, (DAPSK)—a new modulation method for DVBT" in International Broadcasting Convention, pp. 102-108, 1995. DAPSK modulation schemes are found to be much more efficient than pure PSK technology. This analysis was the motivation for a similar design of differential modulation schemes for DSTBC which simultaneously uses amplitude and phase shift keying (APSK). Proposals for integrating APSK into DSTBC are described in X.-G. Xia, "Differentially en/decoded orthogonal space-time block codes with APSK signals" IEEE Communications Letters, vol. 6, pp. 150-152, April 2002, G. Bauch, "A Bandwidth-efficient Scheme for Non-coherent Transmit Diversity", in Proc. of IEEE Globecom Conference, San Francisco, Calif., USA, Dec. 1-5, 2003 and G. Bauch, "Differential Amplitude and Unitary Space-Time Modulation", in Proc. of 5th International ITG Conference on Source and Channel Coding, Erlangen, Jan. 14-16, 2004, the general approach being based on introducing differential amplitude modulation over the entire sequence of code matrices $C_k$ to be transmitted. This technique is analytically described by $$C_k \cdot C_k^* = a_k \cdot I_2, \tag{5}$$

which results in different amplitudes of the code blocks transmitted. The actual information is coded into the amplitude ratio $$\frac{a_k}{a_{k-1}}$$

via two mutually adjacent matrices $C_k$ and $C_{k-1}$. In this case, demodulation is performed separately for amplitude and phase bit.

The basis is therefore DSTBC for two transmit antennas as one of various MIMO (multiple input multiple output) transmission methods. Similarly to a coherent space-time block code in accordance with STBC, DSTBC is based on a complex orthogonal design. However, DSTBC requires no channel information. In the case of original DSTBC, only one pure PSK modulation with correspondingly very limited bandwidth efficiency was used. As an enhancement, an amplitude difference between two consecutive DSTBC blocks has also been encoded, the two information symbols within one such individual DSTBC block always having the same amplitude. However, the envelope of the transmission signal is not constant.

The article Hwang, C.-S. "Differential Space Time Block Codes Using Nonconstant Modulus Constellations", IEEE Transactions on Signal Processing, Vol. 51, No. 11, November 2003, pp. 2955-2964, likewise discloses information encoding by differential space-time block codes.

SUMMARY

One potential object is to improve a method for encoding data with a differential space-time block code, a method for decoding data encoded and transmitted in this way, and a transmitting device and a receiving device for carrying out such methods. In particular the power consumption shall be reduced compared to conventional PSK-modulated DSTBC for the same connection quality and with low compute complexity, and the bandwidth efficiency of DSTBC shall be increased with simultaneous amplitude and phase modulation.

The inventors propose a method for encoding data with a differential space-time block code in which a code matrix is recursively calculated, as a DSTBC block containing symbols to be transmitted over a radio interface, from a current information matrix with a previous code matrix, the information matrix being based on at least two information symbols which are to be transmitted and amplitude modulation being carried out during which the amplitude modulation information is encoded into an amplitude difference between the information symbols inside each individual DSTBC block.

An advantageous method here is one which combines phase modulation and amplitude modulation.

Also advantageous is a method in which the sum of the absolute values of the information symbols is normalized according to $$|s_{1,k}|^2 + |s_{2,k}|^2 = 1.$$

An advantageous method is one in which the two information symbols vary in respect of their information symbol amplitude, but with a constant transmit energy being used.

An advantageous method is one in which the code matrix is calculated by multiplying a current information matrix by a previous code matrix.

An advantageous method is one in which an amplitude of the information symbols varies while their sum of the squares of the amplitudes remains constant, which makes DSTBC processing feasible without any modifications. An advantageous method is one in which a constant transmission signal envelope is additionally combined with other coding methods for encoding the amplitude modulation information into DSTBC block amplitude information.

An advantageous method is one in which 2·L information bits are mapped to two information symbols, in a first step the first L information bits being mapped to a first modulation symbol by a first PSK modulation and, in a second step, the subsequent L−1 information bits being mapped to a second modulation symbol by a second PSK modulation. If a last information bit has a value of 1, in a subsequent step the first modulation symbol is assigned to the first information symbol and the second modulation symbol is assigned to the second information symbol and, if not, in the subsequent step the first modulation symbol is assigned to the second information symbol and the second modulation symbol is assigned to the first information symbol.

An advantageous method of this kind is one in which the first PSK modulation is allocated a first PSK constellation diagram with a first amplitude and the second PSK modulation is allocated a second PSK constellation diagram with a second amplitude, the two amplitudes being non-equal ($A_1 > A_2$) and the sum of the squares of the amplitude being equal to 1 ($A_1^2 + A_2^2 = 1$).

An advantageous method of this kind is one in which a ratio of the first amplitude A1 to the second amplitude A2 is determined, taking the number of receive antennas used into account, by an amplitude value a according to $$A_1 = \frac{\sqrt{1+a}}{\sqrt{2}}, A_2 = \frac{\sqrt{1-a}}{\sqrt{2}}.$$

A preferred method for decoding received DSTBC blocks encoded using such a method is also one in which the last information bit of two received information symbols is demodulated first and then maximum probability PSK demodulation is used for the received information symbols in order to reconstruct original information bits. An advantageous method is one in which, after demodulation of the last information bit, magnitudes i.e. absolute values of the received information symbols, are compared. An advantageous method is one in which, after demodulation of the last information bit, it is decided depending on the amplitude ratio of the last bits that either a first of the received information symbols is demodulated by a first PSK demodulation and a second of the received information symbols is demodulated by a second PSK demodulation or, conversely, the first of the received information symbols is demodulated by the second PSK demodulation and the second of the received information symbols is demodulated by the first PSK demodulation.

Particularly advantageous is a transmitting device for transmitting data over a radio interface using a differential space-time block code and having a modulation device for carrying out such a method of providing a code matrix as a DSTBC block from symbols to be transmitted. Also particularly advantageous is a receiving device for receiving data over a radio interface, the data having been provided with a differential space-time block code (DSTBC) according to such a method, or more specifically a receiving device for receiving modulated data and for carrying out such a demodulation method.

A modulation scheme for DSTBC is therefore described in which PSK and amplitude modulation are combined. In addition to using PSK, the information is encoded in the manner of an amplitude difference between two information symbols within an individual DSTBC block. While the amplitude of the information symbols varies, the sum remains constant, which makes DSTBC processing feasible without any modifications.

The proposed modulation scheme is based on the fact that the equal amplitude condition of the two information symbols is adequate but not necessary for a DSTBC operation. In the preferred modulation scheme, the information is encoded into the amplitude difference between the two information symbols within each individual DSTBC block. By said modulation scheme, the required transmission power is reduced compared to conventional PSK-modulated DSTBC while retaining the same connection quality. The compute complexity of the modulation scheme is low and comparable to that of conventional DSTBC with PSK. Performance is enhanced overall. A constant transmission signal envelope can additionally be combined with solutions of per se known proposals for encoding the information into DSTBC block amplitude information.

The procedure also allows in particular a message to be modulated onto a carrier in the context of orthogonal frequency division modulation (OFDM). In such a system, differential transmission can be carried out in parallel for each sub-carrier. In the latter case, the term carrier also refers to an individual sub-carrier of a multi-carrier system.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a transmission arrangement for DSTBC using two transmit antennas and one receive antenna, FIG. 3 shows such an arrangement for two transmit antennas and a plurality of receive antennas, FIG. 4 shows a 2L-APSK modulation scheme for 3 bit/s/Hz bandwidth efficiency, FIG. 5 shows bit mapping, and FIG. 6 shows a comparison of a bit error rate versus signal-to-noise ratio for 2L-APSK compared to 16-PSK.

DETAILED DESCRIPTION OF THE PREFERRED EMBODIMENT

Figure 1:
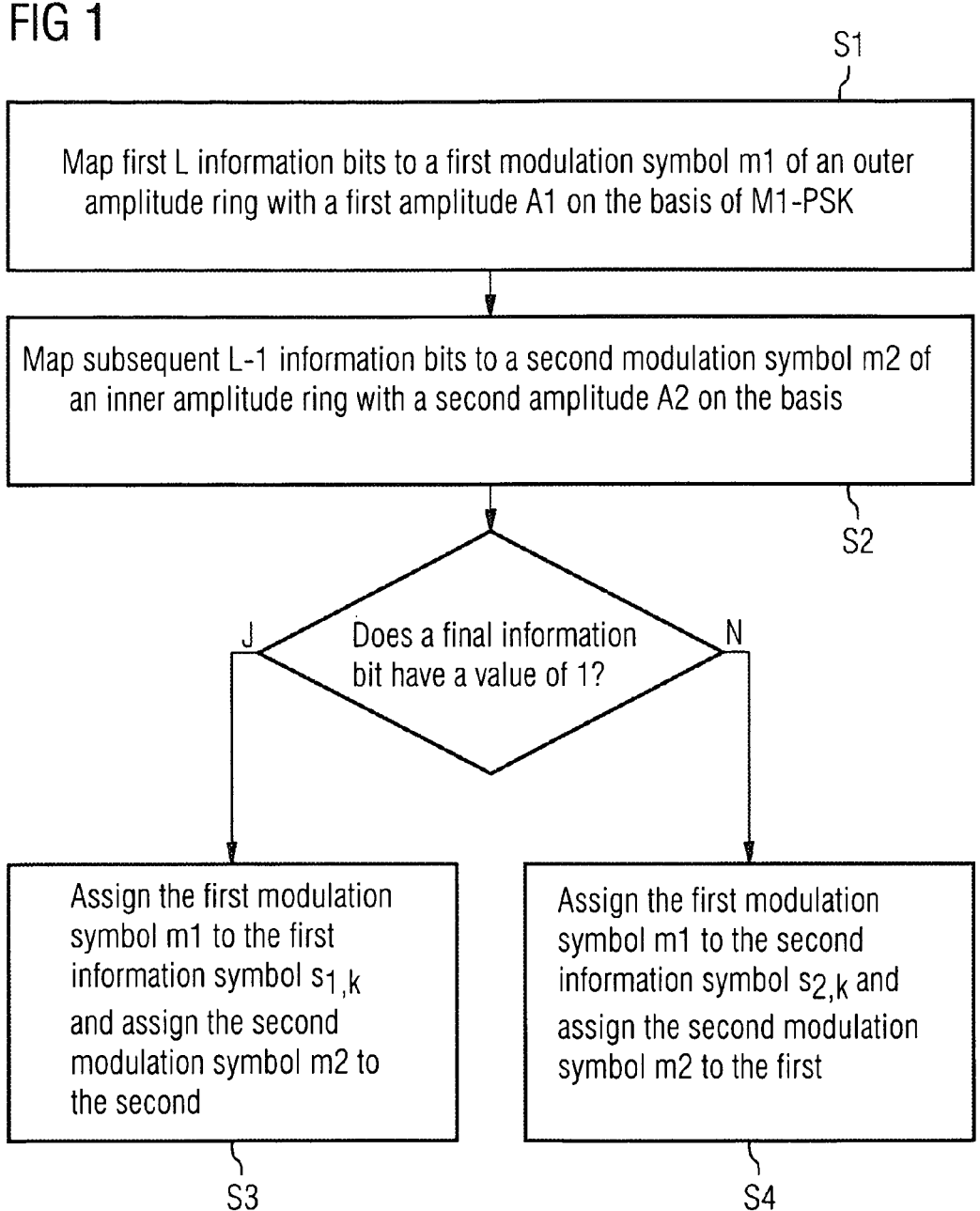
FIG. 1 shows a flowchart with steps for encoding data.

Reference will now be made in detail to the preferred embodiments of the present invention, examples of which are illustrated in the accompanying drawings, wherein like reference numerals refer to like elements throughout.

The coding is based on the fundamentals as known from DSTBC schemes which are based on pure phase shift keying. The basic principle will now be explained beginning with an exemplary arrangement comprising two transmit antennas and one receive antenna, as sketched in FIG. 2.

For the sake of understanding, DSTBC will first be described for two transmit antennas and one receive antenna, a schematic arrangement of the code data to be transmitted and the received data being sketched in FIG. 2. The DSTBC code to be transmitted is rendered by a code matrix C according to the formula (6), the first and second row corresponding to complex-value baseband signals to be transmitted in a first or second time slot $T_1$, $T_2$ and the columns corresponding to the two transmit antennas of a corresponding transmitting device. To initialize a transmission, a reference code matrix $C_0$ is first transferred which carries no actual information. This gives $$C_0 = \begin{pmatrix} c_{1,0} & c_{2,0} \\ -c_{2,0}^* & c_{1,0}^* \end{pmatrix} \quad (6)$$

with coded complex-value symbols $c_{1,0}$ and $c_{2,0}$. Without loss of generality it can be assumed that the transmission power for each individual time slot $T_1$, $T_2$ can be normalized to one, so that for the coded symbols we get $$|c_{1,0}|^2 + |c_{1,0}|^2 = 1. \quad (7)$$

Each code matrix C can be constructed like this first code matrix $C_0$ to be transmitted, according to formula (6) and (7). In the present case this is a unitary matrix, as the product $C_0 \cdot C_0^*$ is an identity matrix according to $$C_0 \cdot C_0^* = (|c_{1,0}|^2 = |c_{1,0}|^2) \cdot I_2 = I_2. \quad (8)$$

The differentially encoded sequence of code matrices $C_k$ is recursively calculated according to $$C_k = S_k \cdot C_{k-1}. \quad (9)$$

The next code matrix $C_k$ in each case is calculated by multiplying the current information matrix $S_k$ by the previous code matrix $C_{k-1}$. This means that the information matrix $S_k$ is differentially encoded similarly to the differential phase modulation schemes. The information matrix $S_k$ is based on two information symbols $s_{1,k}$ and $s_{2,k}$ to be transmitted, according to the information matrix structure of the information matrix $S_k$ with $$S_k \begin{pmatrix} s_{1,k} & s_{2,k} \\ -s_{2,k}^* & s_{1,k}^* \end{pmatrix}. \quad (10)$$

If the information symbols $s_{1,k}$ and $s_{2,k}$ are taken from a pure PSK constellation diagram, the absolute values are normalized according to the following condition which is known per se but is not required according to the preferred example $$|s_{1,k}| = |s_{2,k}| = \frac{1}{\sqrt{2}} \quad (11)$$

In this case it follows from (10) that $$S_k \cdot S_k^* = I_2. \quad (12)$$

This enables it to be shown that the unitary property of the code matrix $C_k$ is retained during the recursive coding process, according to $$C_k \cdot C_k^* = S_k \cdot C_{k-1} \cdot C_{k-1}^* \cdot S_k^* = I_2. \quad (13)$$

Because of the unitary property of the code matrix $C_k$ according to (13), the transmission power remains unchanged, from which it follows that the information matrix $S_k$ can be preserved by $$C_k C_{k-1}^* = S_k \cdot C_{k-1} C_{k-1}^* = S_k. \quad (14)$$

Signal processing in a receiving device will now be explained with reference to a simple example involving only a single receive antenna. A receive signal $r_{1,k}$, $r_{2,k}$ can be represented as a complex-value vector r which is based on the received signal of the code matrix $C_k$ transmitted, the first receive signal component $r_{1,k}$ representing the received signal in the first time slot $T_1$ and the second receive signal component $r_{2,k}$ representing the received signal component in the second time slot $T_2$ of an individual code block $C_k$, yielding $$\begin{pmatrix} r_{1,k} \\ r_{2,k} \end{pmatrix} = \begin{pmatrix} c_{1,k} & c_{2,k} \\ -c_{2,k}^* & c_{1,k}^* \end{pmatrix} \cdot \begin{pmatrix} h_{1,k} \\ h_{2,k} \end{pmatrix} + \begin{pmatrix} n_{1,k} \\ n_{2,k} \end{pmatrix}, \quad (15)$$

where $h_{1,k}$ and $h_{2,k}$ denote a channel transfer function factor of the first and second transmit antenna respectively and n denotes additive noise. In equivalent fashion, this can also be represented by $$\begin{pmatrix} r_{1,k} & -r_{2,k}^* \\ r_{2,k} & r_{1,k}^* \end{pmatrix} = \begin{pmatrix} c_{1,k} & c_{2,k} \\ -c_{2,k}^* & c_{1,k}^* \end{pmatrix} \cdot \begin{pmatrix} h_{1,k} & -h_{2,k}^* \\ h_{2,k} & h_{1,k}^* \end{pmatrix} + \begin{pmatrix} n_{1,k} & -n_{2,k}^* \\ n_{2,k} & n_{1,k}^* \end{pmatrix} \quad (16)$$

or in matrix form by $$R_k = C_k H_k + N_k, \quad (17)$$

where $$R_k = \begin{pmatrix} r_{1,k} & -r_{2,k}^* \\ r_{2,k} & r_{1,k}^* \end{pmatrix}, \quad (18)$$

$$C_k = \begin{pmatrix} c_{1,k} & c_{2,k} \\ -c_{2,k}^* & c_{1,k}^* \end{pmatrix},$$

-continued $$H_k = \begin{pmatrix} h_{1,k} & -h_{2,k}^* \\ h_{2,k} & h_{1,k}^* \end{pmatrix},$$

$$N_k = \begin{pmatrix} n_{1,k} & -n_{2,k}^* \\ n_{2,k} & n_{1,k}^* \end{pmatrix}$$

The receive signal matrix $R_k$ is measured by the receiver, while the code matrix $C_k$, the radio channel transmission matrix $H_k$ and the noise $N_k$ are completely unknown to the receiver. Decoding is performed by multiplying the received signal matrix $R_k$ by the hermitic of the previously received receive signal matrix $R_{k-1}$. This is given by $$G_k = R_k \cdot R_{k-1}^* = (C_k H_k + N_k) \cdot (C_{k-1} H_{k-1} + N_{k-1})^* = C_k H_k H_{k-1}^* C_{k-1}^* + \text{noise}, \quad (19)$$

where $G_k$ represents a demodulation matrix. Assuming that the channel conditions do not change significantly between two consecutive code blocks $C_{k-1}$ and $C_k$, i.e. $H_k \approx H_{k-1}$, it follows that $$H_k H_{k-1}^* = (|h_{1,k}|^2 + |h_{2,k}|^2) \cdot I_2. \quad (20)$$

The demodulation matrix $G_k$ therefore directly contains the two symbols of the information matrix $S_k$ according to $$G_k = (|h_{1,k}|^2 + |h_{2,k}|^2) S_k + \text{noise}. \quad (21)$$

Advantageously, it is to be noted that the demodulation matrix $G_k = R_k \cdot R_{k-1}^*$ has the same structure as the information matrix $S_k$ and the code matrix $C_k$. Accordingly $$G_k = \begin{pmatrix} g_{1,k} & g_{2,k} \\ -g_{2,k}^* & g_{1,k}^* \end{pmatrix}. \quad (22)$$

Without taking any account of noise, the demodulation matrix $G_k$ is proportional to the information matrix $S_k$. The real-value scaling factor $(|h_{1,k}|^2 + |h_{2,k}|^2)$ is unknown in the receiving device at the receiver end, so that it is basically unnecessary technically for the receiving device to estimate the absolute transmission power. However, the relative phase and the relative amplitude of the information matrix $S_k$ or more specifically of its coefficients can be recovered.

From (21) it follows that the information symbols $s_1$, $s_2$ of the information matrix $S_k$ can be estimated directly from the demodulation matrix $G_k$ and then by maximum likelihood demodulation techniques according to $$\hat{s}_{1,k} = \frac{g_{1,k}}{\sqrt{|g_{1,k}|^2 + |g_{2,k}|^2}} \quad (23)$$

and $$\hat{s}_{2,k} = \frac{g_{2,k}}{\sqrt{|g_{1,k}|^2 + |g_{2,k}|^2}}. \quad (24)$$

For a receiving device with a plurality of receive antennas, a similar decoding method can be applied. In this case the matrix product of the receive signal matrix $R_{i,k} \cdot R_{i,k-1}^*$ can be calculated for each receive antenna I. The information symbols $s_{1,k}$ and $s_{2,k}$ are decoded by a modified demodulation matrix $G_k$ using the sum $$G_k = \sum_{i=1}^{M_R} R_{i,k} \cdot R_{i,k-1}^*, \quad (25)$$

where $M_R$ is the number of receive antennas. From (21) and (25) it follows that this decoding method can be described for more receive antennas than a maximum ratio combining (MRC) technique.

According to the preferred embodiment, a modification is performed on the basis of these encoding and decoding methods, it being important to note that all the DSTBC schemes operate in accordance with the insight obtained if $$S_k \cdot S_k^* = I_2 \quad (26)$$

which is a necessary condition for differential coding in accordance with formula (12), it being assumed for the preferred APSK modulation that $S_k \cdot S_k^* = I_2$ even if the information symbols $s_{1,k}$ and $s_{2,k}$ have different amplitudes from one another. From the equation it is only required that the sum of the two symbol absolute values is normalized according to $$|s_{1,k}|^2 + |s_{2,k}|^2 = 1. \quad (27)$$

An equal amplitude condition of the two information symbols $s_{1,k}$ and $s_{2,k}$, as required in formula (10), is sufficient, but not necessary to fulfill the condition of formula (27). In comparison with (3) or (11), formula (27) hence involves less exacting requirements, which gives additional freedom for the coding method. The symbol amplitudes of the information symbols $s_{1,k}$ and $s_{2,k}$ can therefore be used for another amplitude modulation technique.

Accordingly, in accordance with the particularly preferred modulation scheme for DSTBC applications it is proposed to use constant transmit energy, but to vary the two information symbols $s_{1,k}$ and $s_{2,k}$ in respect of their information symbol amplitude.

By way of example, two PSK constellation diagrams will now be considered, an $M_1$-PSK constellation diagram with a first amplitude $A_1$, which is designated the outer ring, and an $M_2$-PSK constellation diagram with a second amplitude $A_2$, which is designated the inner ring, as shown in FIG. 3, the two amplitudes fulfilling the condition of non-equality with $A_1 > A_2$ and the other normalizing condition $$A_1^2 + A_2^2 = 1. \quad (28)$$

Illustrated here is 2L-APSK modulation for a 3 bit/s/Hz bandwidth efficiency. The modulation level of the two constellations $M_1$ and $M_2$ need not necessarily be the same, as the outer ring and the inner ring describe independent constellation diagrams with different bit error rate performance figures. Considered by way of example is the case where the number of information bits carried by an individual DSTBC block is 2·L. It is preferably arranged in this case that each symbol of the outer ring carries L information bits and each symbol of the inner ring L−1 information bits. This give, for example $$M_1 = 2^L \text{ and } M_2 = 2^{L-1}. \quad (29)$$

This means that the number of modulation symbols in the outer ring constellation diagram considered is doubled compared to the inner ring constellation diagram. The final bit of the information bit block of length 2L is only modulated by the signal amplitude. The modulation scheme can therefore be designated 2L-APSK.

An encoding method will now be described by way of example on the basis of four steps S1-S4, the 2·L information bits being mapped to two information symbols as also shown in FIG. 1 and FIG. 4.

In the first step S1, the first L information bits are mapped by Gray coding to a first modulation symbol m1 of the outer amplitude ring with the first amplitude A1 on the basis of M1-PSK modulation. In the second step S2, the subsequent L−1 information bits are again mapped by Gray coding, namely to a second modulation symbol m2 of the inner amplitude ring with the second amplitude A2 on the basis of M2-PSK modulation.

If the final or last information bit has a value of 1, in the third step S3 the first modulation symbol m1 is assigned to the first information symbol $s_{1,k}$, while the second modulation symbol m2 is assigned to the second information symbol $s_{2,k}$. Otherwise, if the last or final information bit has the value 0, in the fourth step S4 the information symbols $s_{1,k}$ and $s_{2,k}$ are interchanged, so that the first modulation symbol m1 is assigned to the second information symbol $s_{2,k}$, while the second modulation symbol m2 is assigned to the first information symbol $s_{1,k}$.

For the L=3 example, the two relevant PSK constellation diagrams 8-PSK and 4-PSK with $M_1=8$ and $M_2=4$ apply. The resulting bandwidth efficiency is 3 bit/s/Hz. In general, such a 2L-APSK scheme for DSTBC has the same bandwidth efficiency as conventional DSTBC with M-PSK and $M=2^L$ modulation for each information symbol.

Incoherent demodulation is advantageously performed in the same way as known per se DSTBC modulation. On the basis of the information symbol estimates according to (23) and (24), which are received by the DSTBC decoder, incoherent demodulation can be performed in two steps. In a first demodulation step the last or final information bit is first demodulated by comparing the absolute values of $|\hat{s}_{1,k}|$ and $|\hat{s}_{2,k}|$ according to (22) and (23). After this decision, maximum probability PSK demodulation is applied for $\hat{s}_{1,k}$ and $\hat{s}_{2,k}$ in order to reconstruct the L and L−1 information bits.

If, for example, $|\hat{s}_{1,k}|^2 > |\hat{s}_{2,k}|^2$, then it is decided that the value of the final information bit is 1 and $\hat{s}_{1,k}$ is demodulated by an $M_1$-PSK demodulator, while $\hat{s}_{2,k}$ is demodulated according to the $M_2$-PSK constellation diagram.

Although the described demodulator is suboptimum, it is remarkably simple technically and exhibits virtually no performance degradation compared to full maximum probability demodulation.

According to initial tests, the preferred 2L-APSK modulation provides a 2 dB signal-to-noise ratio gain over 16-PSK for the same bandwidth efficiency, which surpasses the results of known solutions. Another advantage of the preferred modulation scheme is the avoidance of any amplitude fluctuations of the transmitted total power, which remains constant for all time slots. This advantageously also allows the preferred 2L-APSK modulation scheme to be combined with known versions in order, for example, to perform additional amplitude variations of the DSTBC block as a whole and further increase the performance particularly for high bandwidth efficiencies.

Further optimization is possible by suitably selecting the amplitude ratio of the first amplitude $A_1$ relative to the second amplitude $A_2$, allowance for the number of receive antennas used also being advantageous.

To find an advantageous, in particular optimum amplitude ratio $A_1/A_2$ it is taken into account that $$A_1^2 + A_2^2 = 1 \tag{30}$$

In order to fulfill this condition, an amplitude factor a is introduced according to $$A_1 = \frac{\sqrt{1+a}}{\sqrt{2}}, A_2 = \frac{\sqrt{1-a}}{\sqrt{2}}. \tag{31}$$

The suitable amplitude factor a can be determined in a simple manner, particularly by simulations. When considering the bit error rate, which is mapped via the amplitude factor a for different signal-to-noise ratios, it can be seen that an optimum amplitude factor a which is assigned to a minimum bit error rate is robust and not greatly dependent on the different signal-to-noise values. The tables below show thus determined amplitude factors a and assigned first and second amplitudes $A_1$, $A_2$ for different L.

| L | A | $A_1$ | $A_2$ |
|---|---|---|---|
| 3 | 0.66 | 0.911 | 0.412 |
| 4 | 0.53 | 0.875 | 0.485 |
| 5 | 0.47 | 0.857 | 0.515 |
| 6 | 0.44 | 0.849 | 0.529 |

| L | A | $A_1$ | $A_2$ |
|---|---|---|---|
| 3 | 0.64 | 0.906 | 0.424 |
| 4 | 0.51 | 0.869 | 0.495 |
| 5 | 0.49 | 0.863 | 0.505 |
| 6 | 0.49 | 0.863 | 0.505 |

The first table shows corresponding values for the case of one receive antenna and the second table corresponding values for reception by three receive antennas.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for encoding data using a differential space-time block code (DSTBC), comprising:
   repeatedly forming an information matrix from data to be transmitted using amplitude modulation, each information matrix containing at least two information symbols; and
   recursively calculating a code matrix as a DSTBC block with transmission symbols to be transmitted, the code matrix being calculated from a current information matrix based on a previous code matrix, the DSTBC block being calculated such that amplitude modulation information is encoded into an amplitude difference between at least two of the transmission symbols within the DSTBC block.

2. The method as claimed in claim 1, wherein both phase modulation and amplitude modulation are performed in a combined manner.

3. The method as claimed in claim 1, further comprising normalizing a sum of absolute values of at least two information symbols s1,k, s2,k according $$|s_{1,k}|^2 + |s_{2,k}|^2 = 1.$$

4. The method according to claim 1, wherein
the information symbols are associated with amplitudes that vary, and
although the amplitudes of the of information symbols vary, a transmit energy is kept constant.

5. The method according to claim 1, wherein the code matrix is calculated by multiplying the current information matrix by the previous code matrix.

6. The method according to claim 1, wherein the amplitudes of the information symbols vary, and
although the amplitudes of the information symbols vary, a sum of squares of the amplitudes is kept constant.

7. The method according to claim 1, wherein a transmission signal containing DSTBC block information is produced using a constant envelope for the transmission signal and another method for encoding the amplitude modulation information into the DSTBC block.

8. The method according to claim 1, wherein information bits are mapped to two information symbols by a sequentially performing steps comprising:
mapping first L information bits to a first modulation symbol by a first phase-shift keying (PSK) modulation;
mapping subsequent L−1 information bits to a second modulation symbol by a second PSK modulation;
if a last information bit has a value of 1, assigning the first modulation symbol to a first information symbol and assigning the second modulation symbol to a second information symbol; and
if the last information bit has a value of 0, assigning the first modulation symbol to the second information symbol and assigning the second modulation symbol to the first information symbol.

9. The method as claimed in claim 8, wherein
the first PSK modulation is allocated a first PSK constellation diagram with a first amplitude and the second PSK modulation is allocated a second PSK constellation diagram with a second amplitude,
the first amplitude is greater than the second amplitude, and
the sum of the squares of the amplitudes is equal to 1.

10. The method as claimed in claim 9, wherein an amplitude ratio of the first amplitude to the second amplitude is determined based on a number of receive antennas according to
wherein a is an amplitude factor based on the number of receive antennas.

11. A method for decoding received DSTBC blocks which were encoded by a method using a differential space-time block code (DSTBC), comprising repeatedly forming an information matrix from data to be transmitted using amplitude modulation, each information matrix containing at least two information symbols; and recursively calculating a code matrix as a DSTBC block with transmission symbols to be transmitted, the code matrix being calculated from a current information matrix based on a previous code matrix, the DSTBC block being calculated such that amplitude modulation information is encoded into an amplitude difference between at least two of the transmission symbols within the DSTBC block, wherein information bits are mapped to two information symbols by a sequentially performing steps comprising: mapping first L information bits to a first modulation symbol by a first phase-shift keying (PSK) modulation; mapping subsequent L−1 information bits to a second modulation symbol by a second PSK modulation; if a last information bit has a value of 1, assigning the first modulation symbol to a first information symbol and assigning the second modulation symbol to a second information symbol; and if the last information bit has a value of 0, assigning the first modulation symbol to the second information symbol and assigning the second modulation symbol to the first information symbol, the method for decoding comprising:
demodulating at least one last information bit of two received information symbols; and
after demodulating, applying a maximum probability PSK demodulation to the received information symbols to reconstruct original information bits.

12. The method as claimed in claim 11, wherein after demodulating a last information bit, absolute values of the received information symbols are compared.

13. The method as claimed in claim 11, wherein after demodulating a last information bit, it is decided, depending on an amplitude ratio of the last bits, that:
either a first of the received information symbols is demodulated by a first PSK demodulation and a second of the received information symbols is demodulated by a second PSK demodulation,
or, conversely, the first of the received information symbols is demodulated by the second PSK demodulation and the second of the received information symbols is demodulated by the first PSK demodulation.

14. A transmitting device to transmit data with a differential space-time block code (DSTBC), comprising:
a coding device to:
repeatedly form an information matrix from data to be transmitted using amplitude modulation, each information matrix containing at least two information symbols; and
recursively calculate a code matrix as a DSTBC block with transmission symbols to be transmitted, the code matrix being calculated from a current information matrix based on a previous code matrix, the DSTBC block being calculated such that amplitude modulation information is encoded into an amplitude difference between at least two of the transmission symbols within the DSTBC block; and
a modulation device to modulate a carrier to have an amplitude difference corresponding to a between the information symbols.

15. A receiving device comprising:
a receiver for receiving data over a radio interface, the data being encoded by a method using a differential space-time block code (DSTBC), comprising: repeatedly forming an information matrix from data to be transmitted using amplitude modulation, each information matrix containing at least two information symbols; recursively calculating a code matrix as a DSTBC block with transmission symbols to be transmitted, the code matrix being calculated from a current information matrix based on a previous code matrix, the DSTBC block being calculated such that amplitude modulation information is encoded into an amplitude difference between at least two of the transmission symbols within the DSTBC block, wherein information bits are mapped to two information symbols by a sequentially performing steps comprising: mapping first L information bits to a first modulation symbol by a first phase-shift keying (PSK) modulation; mapping subsequent L−1 information bits to a second modulation symbol by a second PSK modulation; if a last information bit has a value of 1, assigning the first modulation symbol to a first information symbol and assigning the second modulation symbol to a second information symbol; and if the last information bit has a value of 0, assigning the first modulation symbol to the second information symbol and assigning the second modulation symbol to the first information symbol; and a decoding unit to:
demodulate at least one last information bit of two received information symbols; and
after demodulation, apply a maximum probability PSK demodulation to the received information symbols to reconstruct original information bits.

* * * * *